US005726854A

United States Patent [19]

Maki et al.

[11] Patent Number: 5,726,854

[45] Date of Patent: Mar. 10, 1998

[54] VOLTAGE ARRESTOR FOR USE WITH DELICATE ELECTRONIC COMPONENTS

[75] Inventors: Kenneth C. Maki, Coon Rapids; Steven W. Johnson, Minnetonka; Douglas P. McCarron, Minneapolis, all of Minn.

[73] Assignee: Tekna Seal, Inc., Minneapolis, Minn.

[21] Appl. No.: 784,120

[22] Filed: Jan. 15, 1997

Related U.S. Application Data

[63] Continuation-in-part of Ser. No. 739,818, Oct. 30, 1996, abandoned.

[51] Int. Cl.[6] .......... H02H 1/00

[52] U.S. Cl. .......... 361/120; 361/56; 361/111

[58] Field of Search .......... 361/56, 58, 111, 361/113, 117, 120, 124

[56] References Cited

U.S. PATENT DOCUMENTS

| | | | |
|---|---|---|---|
| 1,269,534 | 6/1918 | Gray | 313/622 |
| 1,603,279 | 10/1926 | Gray | 313/622 |
| 1,897,587 | 2/1933 | Pirani | 313/622 |
| 1,990,180 | 2/1935 | Gaidies | 176/122 |
| 2,397,982 | 4/1946 | Salzberg | 250/27.5 |
| 2,492,295 | 12/1949 | Knochel | 250/27.5 |
| 2,540,399 | 2/1951 | Linkroum et al. | 313/622 |
| 3,711,735 | 1/1973 | Foster | 313/216 |
| 5,061,877 | 10/1991 | Akanuma | 313/631 |
| 5,111,109 | 5/1992 | Yagi et al. | 313/622 |
| 5,367,956 | 11/1994 | Fogle, Jr. | 102/202.2 |
| 5,391,961 | 2/1995 | Tsuchiya et al. | 313/634 |

*Primary Examiner*—Marc S. Hoff
*Assistant Examiner*—Stephen Jackson
*Attorney, Agent, or Firm*—Haugen and Nikolai, P.A.

[57] ABSTRACT

A glass-to-metal hermetic seal device which is particularly adapted for application in high pressure and other hostile environments for suppressing or dissipating electrostatic energy incorporating an improved glass-to-metal hermetic seal. The interior of the device incorporates and creates an in-situ gas-filled electrical discharge tube. The gas is an ionizable gas and may conveniently comprise a mixture of nitrogen and Argon, although other ionizable gases such as Xenon may be used. The devices of the present invention utilize one or more electrodes which enter the gas-filled chamber, and when the electrical field of sufficiently high potential is created within the gas-filled chamber, the gas ionizes and becomes conductive so as to effectively dissipate the field.

2 Claims, 3 Drawing Sheets

VOLTAGE ARRESTOR FOR USE WITH DELICATE ELECTRONIC COMPONENTS

CROSS-REFERENCE TO RELATED APPLICATION

The present application constitutes a continuation-in-part of that certain application for U.S. patent Ser. No. 08/739,818, now abandoned filed Oct. 30, 1996, and entitled "METHOD OF SUPPRESSING ELECTROSTATIC ENERGY IN GLASS-TO-METAL HERMETIC SEAL DEVICES".

BACKGROUND OF THE INVENTION

The present invention relates generally to an improved glass hermetically sealed voltage arrestor device incorporating a gas-filled electrical discharge tube, and more particularly to such a device which is designed to protect electronic components and systems, particularly wherein the seal device accommodates multiple electrodes or pins, and wherein the arrestor is arranged in proximity to and in protective relationship to voltage sensitive chips and the like. In devices of this type, each electrode typically represents a separate conductor coupled to one or more circuits and/or components, and wherein a number of such electrodes require the presence of a transient over-voltage arrestor. These arrestors are utilized for the elimination or reduction of over-voltage created by static charge buildup or other causes, and as indicated above, are arranged to protect chips, IC devices or the like during their introduction into assemblies including circuit assemblies as well as during normal utilization, particularly in high pressure applications. More specifically, the arrestors of the present invention relate to devices designed to accommodate a plurality of signal and/or power transmitting electrodes, with one or more being provided with an over-voltage protective feature in the form of an arrestor or otherwise discharge capability. These devices have operational characteristics which are ideally suited for application in combination with delicate circuits utilized in applications wherein the delicate circuit components may, at certain times, be exposed to high hydrostatic pressures. While devices of the present invention may be used in combination with systems involving pyrotechnic initiation, the devices of the present invention are also well adapted for use in condition-responsive sensors utilized in process control operations including oil pipelines, and the like.

By way of specific examples, the device of the present invention finds utility in other applications, such as for use in combination with condition-responsive sensors employed in chemical processing systems, and the like. The operational characteristics of the arrestors of the present invention effectively and reliably function to relieve transient over-voltages so as to eliminate static charges for the protection of semiconductor chips and other components of circuits used in combination with condition-responsive sensors. Effective operation of these arrestor devices enhances the reliability of such circuits and provides protection for circuits which employ delicate components which may be impaired or damaged when exposed to transient over-voltage resulting from static buildup created and/or generated by a variety of circumstances.

The gas-filled electrical discharge tube arrestor devices of the present invention may be utilized to effectively provide leakage paths or voltage arrestors for transient over-voltage to ground for any of a number of circuits or circuit components. These devices provide one or more electrodes which are positioned in close proximity to semiconductor chips or other delicate components and are coupled via thin lead wires and/or otherwise situated for exposure to buildup of transient over-voltage. The arrangement is such that when any one of the over-voltage discharge electrodes receives a buildup due to exposure to an elevated static charge, the electrode sharply initiates and/or creates a leakage path through a gaseous discharge which converts from its insulative state to its conductive state upon exposure to the potential carried by the electrode. In addition to the protection of circuitry including delicate components and the like, the device of the present invention serves to protect persons and equipment during production, utilization and servicing of potentially explosive devices due to the occurrence of inadvertent initiation caused by the presence of transient over-voltage. Because of the rugged construction of the device and its high degree of reliability, a wide variety of other applications exist for the device as well.

Because of the geometry of the device, it is possible to employ a conventional pin arrangement which will accommodate conventional sockets, and in those instances where dissipation or leakage to ground is undesired, electrodes may be positioned in such a way that they are encased within an insulative sheath such as a glass, glass/ceramic, or ceramic sleeve or disc structure. In other words, it is possible to select any number of pins to be equipped with the arrestor feature of the present invention. Further, the geometry of the device is such that the external area exposed to glass or ceramic components is limited, thus permitting utilization in applications or environments where elevated pressures may be encountered. Also, the configuration of the devices of the present invention are such that they may be conveniently employed to retrofit designs for existing assemblies without requiring significant redesign efforts for accommodating the device within existing circuit parameters.

In the past, a number of electrical discharge devices have been designed for applications leading to the elimination or reduction of transient over-voltage due to static charge buildup or otherwise, to provide for component and circuit protection and related applications. Frequently, these prior devices have been fabricated as intermittently conductive components such as gas-filled glass envelopes and hence lack the ruggedness and stability required for applications such as required in systems subject to shock loading and other systems having the requirement of an ability to absorb and withstand high pressures or shock. The apparatus of the present invention utilizes a body such as a cylinder of steel or other conductive rigid durable material, with the interior of the cylinder being provided with a plurality of electrode-receiving bores, and with selected electrodes including over-voltage protection. The over-voltage electrodes within the bores are typically provided with a pair of axially spaced apart annular glass or glass/ceramic sleeves having a central bore formed therein for contacting and positioning the electrode in radially spaced relationship to the inner peripheral wall of the bore. The inner and outer surfaces of each of the annular glass or ceramic sleeves are then sealed to the electrode and peripheral wall respectively, with the axially spaced apart zone between the sleeves being preferably along the central portion of the body and forming a chamber for receiving and retaining a fill of an ionizable gas such as, for example, Argon.

In addition to mechanical properties, certain of the devices of the prior art lack the lifetime requirements for use in a variety of applications, with failure of the transient over-voltage arrestor serving to decrease the safety, stability and lifetime of components and circuitry.

Because of the intended application, production techniques must be developed which combine reliability and longevity, along with a minimum of any increase in production costs. Because the present devices require only a minimum number of components, and with the adaptation of these components to a variety of configurations, including a stepped-bore formed in the body, conventional jig retention and positioning operations, along with conventional and low-cost production techniques may be employed for the devices of the present invention without significantly increasing production costs.

By way of appropriate production techniques, use of conveyor furnaces having controlled atmospheres comprising ionizable gases have been found suitable. The ionizable gas atmosphere is provided in such a way that the residence time permits the ambient gases in the assembly including internal cavities to become uniformly displaced with the charge of ionizable gas from the furnace atmosphere. Upon sealing, this gas is captured and retained within a chamber formed within the assembly. In this fashion, gas retention and hermetic sealing is achieved without requiring additional costly operations. As an alternative to conveyor furnaces, enclosed heated chambers containing an appropriate atmosphere and heated to proper elevated temperatures may be used. Such batch processing techniques may be employed in order to reduce or further control the volume and other requirements of ionizable gases utilized.

As indicated above, in addition to other applications, the primary applications for devices of the present invention are in combination with condition responsive devices or sensors subject to damage in the presence of transient over-voltages due primarily to static charges. Other applications include use in combination with pyrotechnic initiation circuits. Typically, these circuits require protection against static or other over-voltage occurrences for elimination and/or reduction of inadvertent initiation in the case of pyrotechnics, or erroneous readings in the case of dealing with condition responsive sensors. The apparatus of the present invention provides a safe, rugged, and reliable system for circuit control, with the control contributing to enhancement of lifetime and performance of the circuitry and its components.

Among the variety of applications for the devices of the present invention utilizing plural electrodes are pyrotechnic initiators which are utilized in a variety of industrial, mining and military applications. By way of example, pyrotechnic initiators may be utilized to interpose barriers for rapid isolation of chambers containing radio-active or other dangerous materials, particularly where safety to personnel or the environment is concerned. It is essential in such applications that the initiators function properly on demand, while it remains equally important that these initiators are not falsely activated due to the presence of transient overvoltage due to buildup of static charges or other similar phenomena. Again, reduction and/or elimination of any buildup of such over-voltages will correspondingly reduce the occurrences of inadvertent actuation of systems employing such activation or initiation devices.

SUMMARY OF THE INVENTION

Briefly, in accordance with the present invention, a device incorporating one or more glass-to-metal hermetic seals incorporating a gas-filled discharge tube is provided. The device comprises a body member in the form of a cylinder with a plurality of axially parallel electrode-receiving bores preferably of stepped diameter extending therethrough. A pair of axially spaced apart electrically insulative annular glass cylinders or discs are disposed in opposed sealed relationship between the inner surface of the bore and the outer surface of the electrode. The zone in the bore between the opposed annular sleeves defines and creates an ionizable gas-filled sealed chamber, with the chamber extending transversely to the longitudinal axis of the electrode. A plurality of such electrodes may extend through the body of the device, with each of those electrodes present which may require protection from or elimination of static or other transient over-voltage charges being exposed to the ionizable gas-filled sealed chamber for the abrupt creation of a conductive path to ground. All electrodes which may require similar protection are similarly positioned with a segment of the electrode being exposed to the ionizable gas-filled chamber and effectively coupled to ground upon initiation of gaseous ionization/conductivity.

In the embodiments of the invention, the individual electrodes are provided with their body portions sealingly engaged with and extending through the annular glass sleeves and into or through the sealed ionizable gas-filled chamber. When in its operative disposition in the circuit, and when the potential between one of the over-voltage relief electrodes and the conductive cylindrical body becomes sufficiently high to initiate ionization or breakdown of the ionizable gas, a predictable and reliable low resistance path is abruptly established between the electrode and the cylindrical body. Because of the dimensional tolerances, creation of repeatable configurations, and the reliability and uniformity of the sealingly retained gas fill, the device has been found to predictably respond to reasonably well defined voltage or potential differences. By way of specific application to certain systems, ionization or breakdown of the ionizable gas must occur in response to voltage or potential differences in an operational window of not less than a certain selected and predetermined threshold potential, for example, greater than about 500 volts, but not in excess of a second predetermined threshold potential, for example, about 1500 volts. Other windows of threshold potential may be found useful and desirable for any given application.

The arrangement of the present invention facilitates the assembly to use of conventional processing techniques. For example, as the glass forming the annular sleeve members becomes fused, the fusion zone advances from both inner and outer metallic contact surfaces, thus serving to capture the ionizable gas within the preformed cavity between the interposed sleeves. Upon wetting of the metallic surfaces by the glass sleeve segments, the chamber is securely sealed from further exposure to the ambient as well as from internal leakage.

While a single over-voltage relief electrode may be employed, alternative structures are possible wherein any number of such electrodes may be provided. In such multiple electrode structures, the gas envelope may remain the same as that previously discussed, with the difference being the availability of selectively variable electrode-to-conductive peripheral wall spacing to serve as a parameter to control triggering of the gaseous breakdown. In such situations, a shoulder segment may be provided along the length of the electrode with the annular glass discs being positioned on either side of the shoulder.

Therefore, it is a primary object of the present invention to provide an improved glass hermetic seal incorporating an ionizable gas-filled electrical discharge tube which employs a body member in the form of a cylinder housing with one or more electrodes arranged within an internally disposed glass sealed chamber, the arrangement including one or more ionizable gas-filled sealed chambers in the cylindrical body wherein the gas ionizes in the presence of a high potential field to create a conductive path between the electrodes and conductive cylindrical body in response to the presence of an over-voltage between the electrode and ground or other reference voltage.

It is a further object of the present invention to provide a glass hermetic seal assembly incorporating a gas-filled electrical discharge tube as described which includes an outer cylindrical body with a plurality of axially parallel electrodes positioned therewithin and with a pair of spaced apart glass sleeves for sealing the electrode within the cylindrical body.

It is yet a further object of the present invention to provide a process for preparing multiple electrode hermetically sealed gas-filled electrical discharge tubes providing over-voltage relief for electrodes therewithin, with the process creating gaseous discharge tubes with rugged and reliable characteristics, while employing conventional glass/metal assembly processing and fabrication equipment.

Other and further objects of the present invention will become apparent to those skilled in the art upon a study of the following specification, appended claims, and accompanying drawings.

IN THE DRAWINGS

Figure 3:
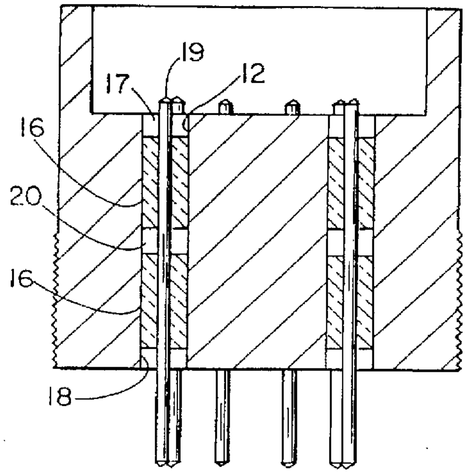
FIG. 3 is a vertical sectional view taken along the line and in the direction of the arrows 3—3 of FIG. 2.
Figure 7:
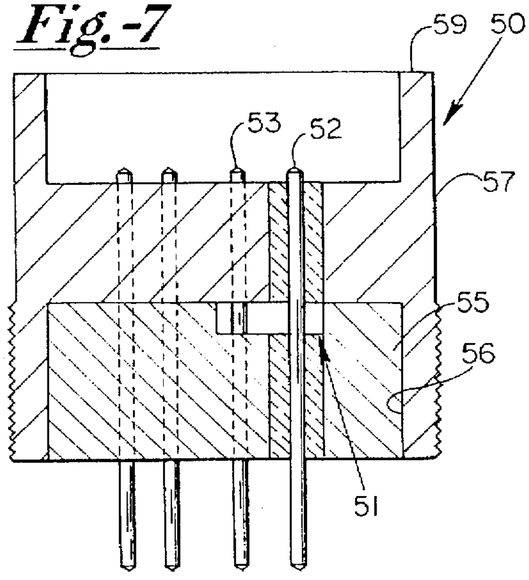
Figure 8:
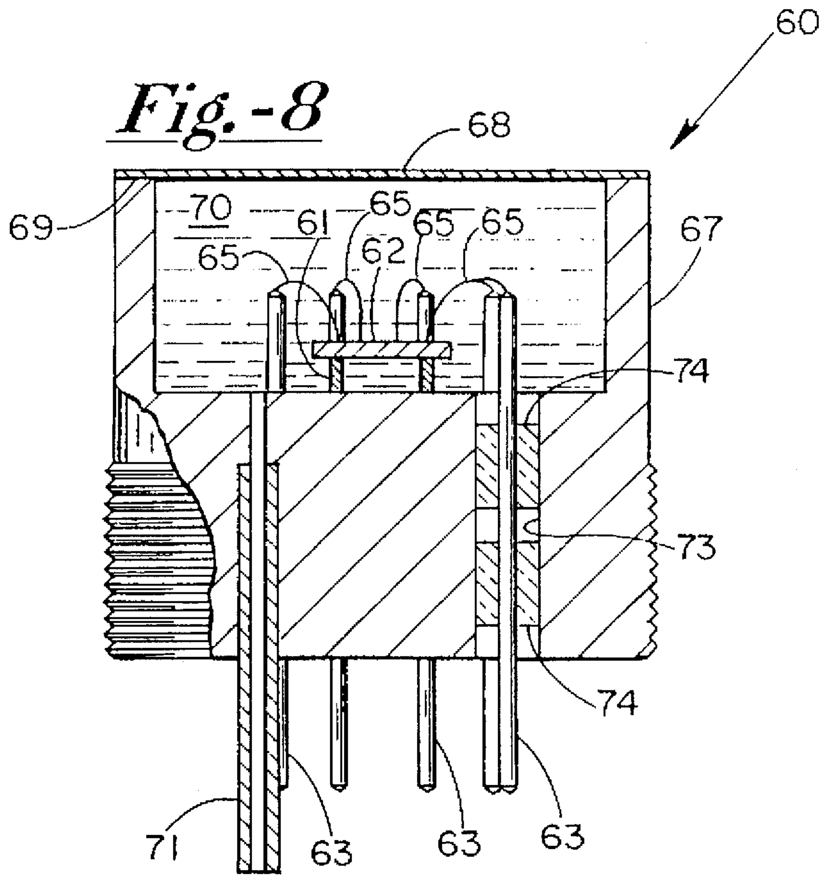

FIG. 7 is a view similar to FIG. 3 and illustrating a modified body configuration for the electrodes and electrode receiving bores wherein an insert is placed within the body, and wherein certain electrodes are arranged within a common cavity or chamber containing a fill of an ionizable gas; and FIG. 8 is a view similar to FIG. 3 and illustrating an assembly including a hermetically sealed gas-filled electrical discharge tube in accordance with the present invention, and incorporating therewith a diaphragm secured to the top of the assembly for enclosing a condition responsive device for pressure sensing applications.

DESCRIPTION OF THE FIRST PREFERRED EMBODIMENT

Figure 1:
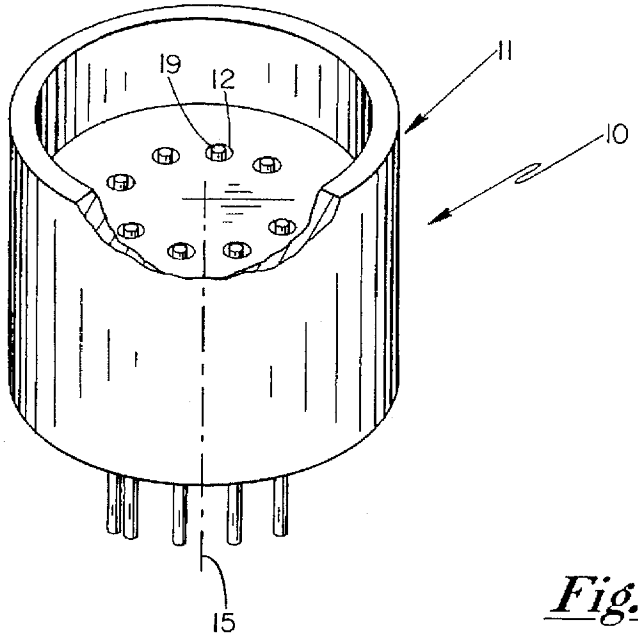
FIG. 1 is a perspective view of a hermetically sealed gas-filled electrical discharge tube prepared in accordance with one preferred embodiment of the present invention.
Figure 2:
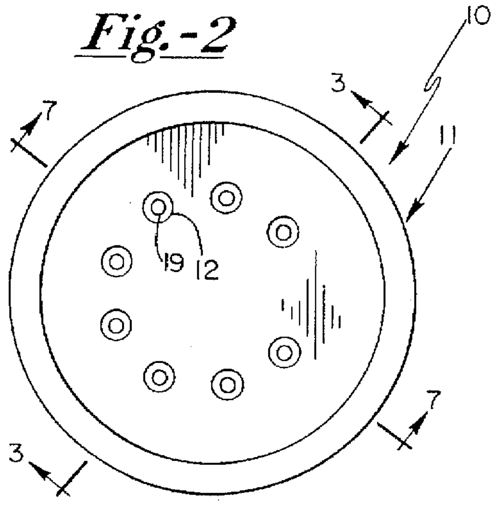
FIG. 2 is a top plan view of the electrical discharge tube of FIG. 1.

In accordance with one of the preferred embodiments of the present invention and with attention being directed to FIGS. 1–3 of the drawings, the glass hermetic seal device incorporating a gas-filled electrical discharge tube generally designated 10 comprises a cylindrical body member 11 consisting of a conductive metal such as steel or the like, and having a plurality of axially aligned bores formed therewithin, including bores 12—12. As illustrated, the body 11 has a longitudinal axis as shown at 15. Electrically insulative glass discs or sleeves shown generally at 16—16 are positioned within the core 17 of bore 12, with the space or gap between glass discs further forming a chamber as at 20. Electrode 19 is provided, being sealingly disposed within the glass discs 16—16 and extending through the chamber zone 20.

This embodiment is one which is normally preferred when considering certain properties and advantages, and particularly when performance requires substantially immediate, abrupt, or rapid discharge from an electrode. In this connection, devices fabricated consistent with this embodiment have been found to perform exceptionally well when considering this performance characteristic.

FIRST ALTERNATIVE PREFERRED EMBODIMENT

Figure 4:
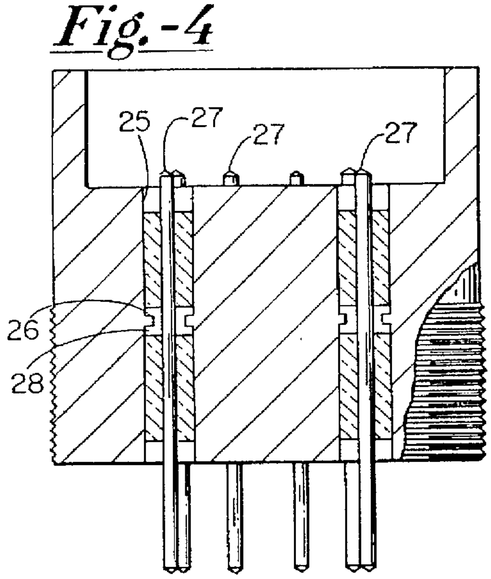
FIG. 4 is a vertical sectional view similar to FIG. 3, but being directed to a modified structural arrangement for the electrode receiving bores, and illustrating an alternate preferred embodiment of the present invention.

With attention being directed to FIG. 4 of the drawings, a modified electrode receiving bore configuration for a gas-filled electrical discharge device is illustrated. In FIG. 4, the gas-filled electrical discharge tube device is similar to that described in FIGS. 1, 2 and 3, with the exception of the configuration of the electrode receiving bore 25. Bore 25, rather than being cylindrical in its configuration, has a shoulder portion or zone 26 formed therealong, which serves to control and/or modify the voltage required for breakdown. In utilizing this feature, a single gas-filled electrical discharge tube device may be fabricated utilizing electrode receiving bores with variable shoulder diameters, thereby controllably adjusting the magnitude of over-voltage required to achieve breakdown for individual electrodes. Thus, depending upon the circuit parameters and environments involved, breakdown voltages may be controllably adjusted.

The embodiments of the present invention are designed to permit utilization of conventional socket configurations, and particularly wherein at least one of the electrodes requires relief from static, stray, or other inadvertently created over-voltage condition. It will be appreciated that the remaining electrodes, such as electrodes 27—27 are configured in a similar fashion, and accordingly communicating with ionizable gas fill provided within chamber 28.

SECOND ALTERNATIVE PREFERRED EMBODIMENT

Figure 5:
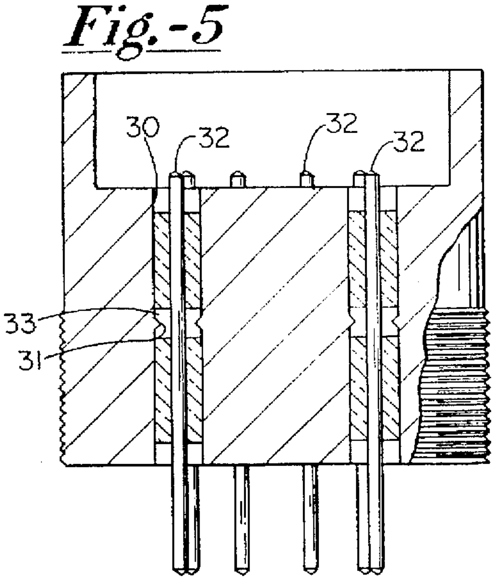
FIG. 5 is a vertical sectional view similar to FIG. 4 and illustrating an alternate configuration for the electrode receiving bores.

With attention being directed to FIG. 5 of the drawings, a further modified electrode receiving bore configuration for a gas-filled electrical discharge device is illustrated. In FIG. 5, the gas-filled electrical discharge tube device is similar to that described in FIGS. 1–3, with the exception of the configuration of the electrode receiving bore 30. Bore 30, rather than being cylindrical in its configuration, has an annular conical shoulder portion or zone 31 formed therealong, which serves to control and/or modify the voltage required for breakdown. In utilizing this feature, the peak or apex of the conical shoulder provides a concentrated point for initiating breakdown. In utilizing this feature, a single gas-filled electrical discharge tube device may be fabricated utilizing electrode receiving bores with variable annular conical rings therein, thereby controllably adjusting the magnitude of over-voltage required to achieve breakdown for initial electrodes. Thus, depending upon the circuit parameters and environments involved, breakdown voltages may be controllably adjusted, it being appreciated that remaining electrodes, such as electrodes 32—32 are configured in a similar fashion and accordingly in communication with ionizable gas fill provided within chamber 33.

THIRD ALTERNATIVE PREFERRED EMBODIMENT

Figure 6:
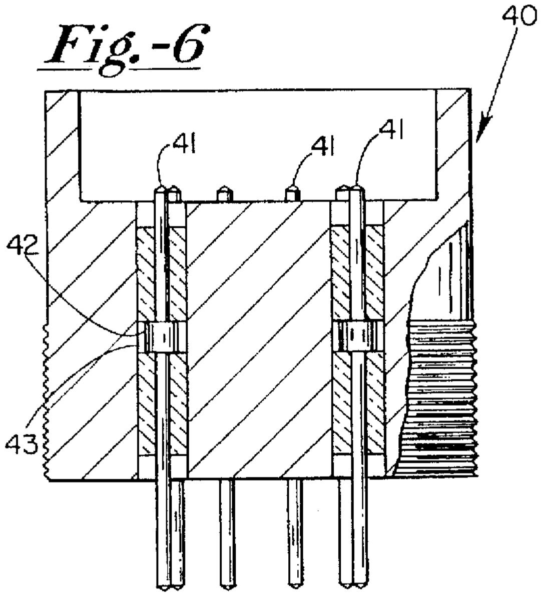
FIG. 6 is a view similar to FIG. 3, but being directed to a modified electrode configuration.

With attention now being directed to FIG. 6 of the drawings, a modified electrode configuration for a gas-filled electrical discharge device is illustrated. In FIG. 6, the gas-filled electrical discharge tube device 40 is similar to that described in FIGS. 1–3, with the exception of the configuration of electrode 41. Electrode 41, rather than being cylindrical in its configuration, has an expanded shoulder portion or zone 42 formed therealong, which serves to control and/or modify the voltage required for breakdown. In utilizing this feature, a single gas-filled electrical discharge tube device may be fabricated utilizing a number of electrodes with variable shoulder diameters, thereby controllably adjusting the magnitude of over-voltage required to achieve breakdown for individual electrodes. Thus, depending upon the circuit parameters and environments involved, breakdown voltages may be controllably adjusted, it being appreciated that the remaining electrodes such as other electrodes 41—41 are configured in a similar fashion, and accordingly in communication with the ionizable gas fill provided within chamber 43.

ALTERNATIVE CHAMBER ARRANGEMENT

With attention being directed to FIG. 7 of the drawings, a modified configuration for the chamber containing the ionizable gas fill is provided. In FIG. 7, the gas-filled electrical discharge tube device generally designated 50 is similar to that described in FIGS. 1–3, with the exception of the configuration of the chamber receiving the ionizable gas fill, such as shown generally at 51. Chamber 51, rather than being arranged for a single electrode, serves to accommodate plural electrodes, including electrodes 52 and 53, for example. In utilizing this feature, a single gas-filled chamber arranged for accommodating plural electrodes is designed to provide simultaneous over-voltage protection for plural electrodes, with this over-voltage protection being initiated whenever one of the accommodated electrodes reaches an over-voltage condition. Thus, depending upon the circuit parameters and environments involved, a simultaneous discharge may be achieved for multiple electrodes.

In fabricating the device, it will be noted that insert 55 is welded or otherwise received within bore 56 formed in metallic body 57. Alternatively, two multi-holed glass discs may be provided for insertion within a metallic sleeve, with the discs being spaced apart to create a gas-filled chamber within the metallic cylindrical sleeve body. In lieu of glass discs, ceramic-filled glass discs may be employed in order to preserve the shape and/or configuration of the discharge chamber.

Attention is now directed to FIG. 8 of the drawings wherein the assembly 60 incorporates a pressure sensitive silicon wafer with impedance characteristics such as capacitive or resistive values subject to change in response to changes in pressure. Silicon wafers of such a type are, of course, commercially available. A pad in the form of an annular adhesive ring is provided as at 61 for bonding wafer 62 into the assembly and to form a pressure reference chamber. Each of the individual electrodes 63—63 is coupled to a conductive pad formed on the surface of wafer 62 by welded leads 65—65.

For operation, assembly 60 is provided with a thin metallic diaphragm as at 68, with diaphragm 68 being bonded to body 67 along an annular bonding ring as at 69. Diaphragm 68 is exposed to an environment, the condition of the pressure of which is being monitored, with changes in pressure within the monitored zone being reflected in the configuration of diaphragm 68. As is typical in these devices, when pressure builds up, diaphragm 68 deflects so as to change or alter the pressure existing within chamber 70, which in turn, is detected by the pressure sensitive silicon wafer 62. Chamber 70 is filled with an oil or other fluid, with the fill being achieved through oil fill tube 71, typically pinched-off following introduction of fluids into chamber 70.

The gas-filled electrical discharge device of FIG. 8 is similar to that described in FIGS. 1–3, with the exception of the incorporation of the fill tube 71, and, of course, illustrating the combination of the gas-filled electrical discharge device with a condition responsive device. The arrangement of FIG. 8 includes, of course, a gas-filled chamber as at 73 along with glass discs or sleeves 74—74 sealingly engaged within body 67.

The processing techniques which may be employed for fabrication of the devices of FIGS. 1 through 8 are essentially the same, with departures, if any, being undertaken in response to the configurations of the devices involved. These departures will become readily apparent to those skilled in the art when considering the individual configurations or geometries involved.

PROCESSING CONSIDERATIONS

For processing considerations, the discharge tube structures of the present invention may be prepared utilizing conventional glass-to-metal seal production techniques. Continuously fed conveyor ovens with infeed and outfeed air locks may be employed for treating the assemblies. Alternatively, closed heated chambers or ovens may be employed. Equipment selection depends upon availability as well as production and other capabilities and requirements of the processor. In each instance, an ionizable gas, preferably containing Argon, is employed to displace the ambient air from the assemblies to provide the desired fill while the thermal processing operations are underway.

In a typical processing operation, a ferrous metal sleeve is selected for the body member with electrically insulative glass, such as 2164 glass available from Electro-Glass Corporation of Mammoth, Pa. being employed in the form of either one or more rod-like segments or cylinders.

With attention being directed to the embodiment illustrated in FIGS. 1–3, the disc or sleeve members 16 are positioned within cylinder body 11. Electrodes, such as electrodes 19—19, among others, are arranged in bores previously formed within cylinder body 11. These electrodes extend into the individual chambers such as chamber 20 formed by glass discs 16—16. The entire assembly is then positioned and retained within a jig, such as the conventionally utilized graphite jig, for passage through an oven for exposure to the heat and ionizable gas atmosphere. The ionizable gas atmosphere and temperature control are such that the assembly forming the hermetically sealed gas-filled electrical discharge device is exposed to the ionizable gas atmosphere and flushed for a sufficient time interval so as to provide for complete displacement of the ambience and for equilibrium to be established between the furnace atmosphere and the components, thereby appropriately filling the chamber defined by channel 20, with the ionizable gas comprising the atmosphere, normally an atmosphere including Argon. As indicated herein, the ionizable gas forming the atmosphere may include a mixture of nitrogen and Argon, with the individual gases or mixtures of these gases being introduced into the furnace preferably through an initial discharge of nitrogen gas into the atmosphere followed by a discharge of Argon gas into the atmosphere within the heated chamber. Both the nitrogen and Argon components for the atmosphere are introduced at a point prior to fusion of the glass in order to permit the gaseous atmosphere to displace other gases within the assembly. By way of example, and in a conveyor furnace, the nitrogen atmosphere is introduced at a zone or point in the front portion of the furnace where the temperature of the assemblies is increasing, but while the assemblies are at a temperature well below the melting point of the glass. Argon is introduced to form an atmosphere to surround and wash the parts at a later point in the thermal process where the assembly temperatures have been raised to a temperature of about 600 degrees C. and higher, but yet below fusion. The rate of introduction of the individual gases is such that the flow rates provide an atmosphere which on the average is about two-thirds nitrogen, one-third Argon. An appropriate pressure for most processing applications is atmospheric, or just slightly above or below. An appropriate residence time for devices to undergo a complete cycle within the conveyor furnace has been found to be about two hours. Such a process to create such a residence time may be undertaken in a conveyor furnace having a heated/working length of about 20 feet.

Most commercially available glasses suitable for glass hermetic sealing of either compression or matched type can be processed at temperatures in excess of their melting points. One suitable glass for use in connection with the present invention is 2164 glass available from Electro-Glass Corporation of Mammoth, Pa. A processing temperature of approximately 1000 degrees C. is normally satisfactory. For finished devices having diameters between about 0.050 up to 2 inches or more, the unfinished assembly is typically subjected to this elevated temperature for a period sufficient to cause substantially complete fusion of the glass component, and thereby permit the glass rod segments to become bonded or otherwise sealed to the inner surface of the cylindrical sleeve as well as to the surfaces of each of the electrodes.

As an alternative to embedding the electrodes within the glass disc portions, the utilization of ceramic or loaded glass discs may be undertaken. Such a disc may be used on the surface of one or more of the electrodes. The discs are preferably in axial alignment with the electrodes.

In the arrangement of FIGS. 1–3, the ionizable gas present in the atmosphere displaces the ambience originally present in the entire device system, and when the inner and outer surfaces of the glass discs or sleeves reach a fusion temperature, an effective seal is formed along the surface of the rod, thus retaining the ionizable gas within the preformed chamber. In other words, it has been found that centrally or medially positioned chambers normally remain intact and definable by virtue of the presence of the captured gaseous atmosphere. The pressure within the immediate confines of the chamber is such that the inner surfaces of the metallic bore defining the chamber are not wetted or coated with the glass, and hence preserve electrical continuity through the chamber between the outer cylinder and the surface of the electrodes as well as other electrodes. As is apparent, these processing considerations are applicable to the alternate configurations as well, and may be employed appropriately.

In the embodiment of FIGS. 4 and 5, the shoulder portion of the bore, and in FIG. 6, the shoulder portion of the electrode will serve to support the disc as its inner and outer peripheries become fused. As indicated above, however, for most applications, the presence of the gas within the chamber along with the wetting of the metallic surfaces adjacent the periphery serves to form a substantially gas-tight chamber with the gas pressure providing support for the upper disc during processing.

In pressure sensor devices of the type illustrated in FIG. 8, these assemblies are typically arranged in a configuration with one surface of the silicon wafer being exposed to a cavity referenced to a specific pressure. When the cavity is at atmosphere, the device is referenced to respond to gauge pressure. Obviously, other reference pressures or vacuum may be utilized in the chamber 70 defined by annular ring 61. Thus, deflection of the silicon wafer on compression, for example, will be manifested in a change in capacitance and/or resistance.

By way of materials of construction, it has been found appropriate to fabricate the outer cylindrical body member as well as the electrodes from steel or stainless steel, with a wide variety of stainless steels having been found suitable for this application. Other metals may also be employed for fabricating the sleeve, particularly where the application requires use of metals having properties different from that of stainless steel. Typical of other applicable metals or usable metals are aluminum and titanium, although others may be found useful in certain applications as well.

For high pressure applications including exposure to environments operating under high pressure, such as a pipelines or the like, a ratio of bore diameter to pin diameter of about 3 is desired for enhancement of strength and other mechanical properties. Thus, in a system incorporating an electrode having a diameter of 40 mils, a bore diameter of, for example, 0.125 inch would be preferable. The pin-to-pin spacing is, of course, determined by the geometry of connectors and other features, and will be undertaken.

PERFORMANCE

By way of performance criteria or example, the electrode-to-sleeve wall or dimension is approximately 0.050 inches, and with a mixture of gas consisting primarily of nitrogen and Argon being present at atmospheric pressure. In such an arrangement, breakdown and/or ionization of the gas occurs at a voltage difference of between about 300 volts DC and 1500 volts DC, with such breakdown normally occurring in these devices at a potential difference of about 750 volts DC. As indicated hereinabove, and for the purpose of protecting the devices, appropriate minimum potential differences are easily specified. On the other hand, a breakdown maximum will also be readily established.

This invention has been described herein in considerable detail in order to comply with the Patent Statutes and to provide those skilled in the art with the information needed to apply the novel principles and to construct and use the same. However, it is to be understood that the invention can be carried out by specifically different equipment and devices, and that various modifications, both as to the equipment details and operating procedures, can be accomplished without departing from the scope of the invention itself.

What is claimed is:

1. A gas-filled electrical discharge tube comprising:

(a) a body member consisting of an electrically conductive cylindrical sleeve with inner and outer surfaces and a longitudinal axis;

(b) an electrically insulative glass rod with the outer surface thereof being disposed in sealed relationship with the inner surface of said cylindrical sleeve and having a gas-filled sealed chamber therewithin and with a portion of said chamber extending generally transversely of said longitudinal axis to said rod outer surface generally midway along the length of said glass rod, and with the inner surface of said cylindrical sleeve being in communication with said sealed chamber;

(c) a plurality of conductive elongated cylindrical electrodes with parallelly disposed axes extending through said glass rod and arranged parallel to said longitudinal axis and with at least one such electrode extending through said gas-filled sealed chamber; and (d) said gas fill consisting essentially of an ionizable gas at substantially atmospheric pressure.

2. The gas-filled electrical discharge tube as defined in claim 1 being particularly characterized in that said ionizable gas is a mixture of nitrogen and Argon.

* * * * *